April 7, 1931.  J. B. ELFRING ET AL  1,799,739
PRECISION MEASURING DEVICE
Filed Nov. 13, 1926   2 Sheets-Sheet 1
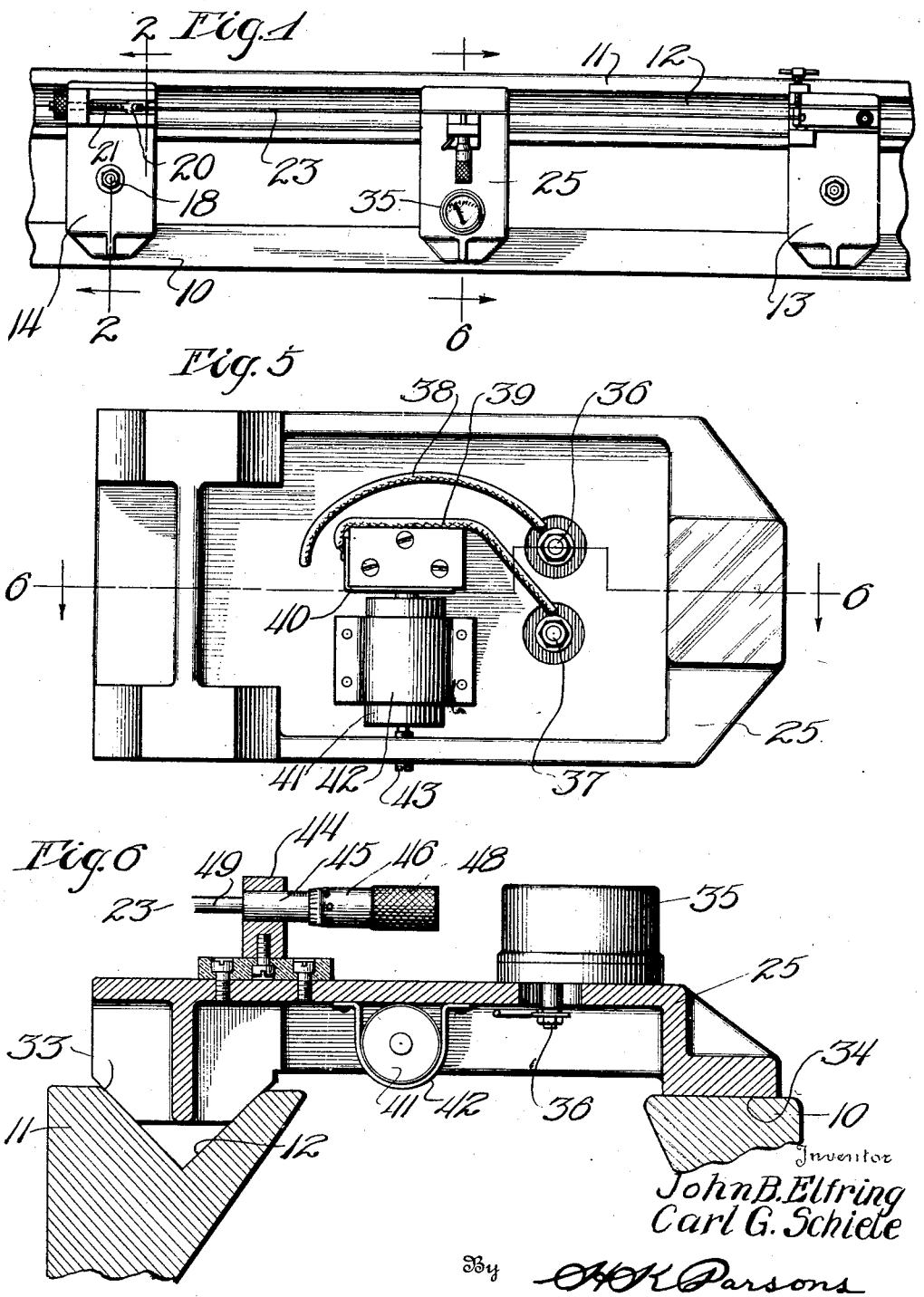

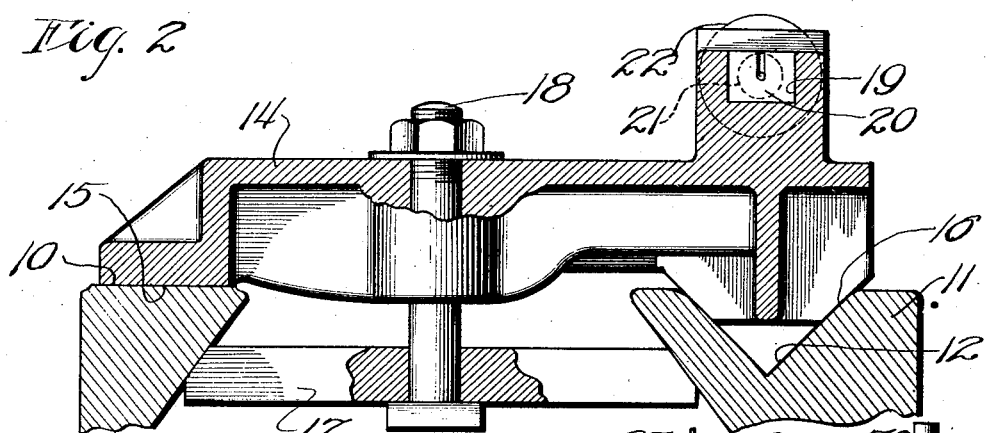
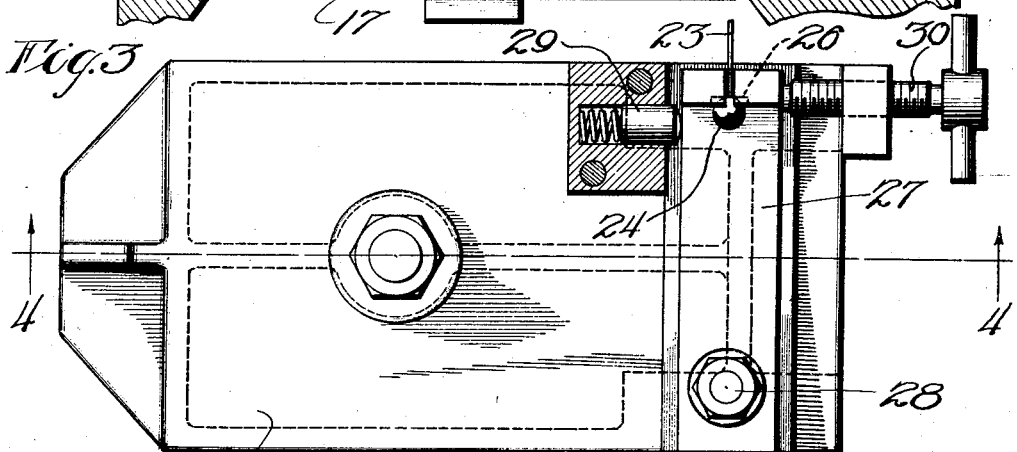
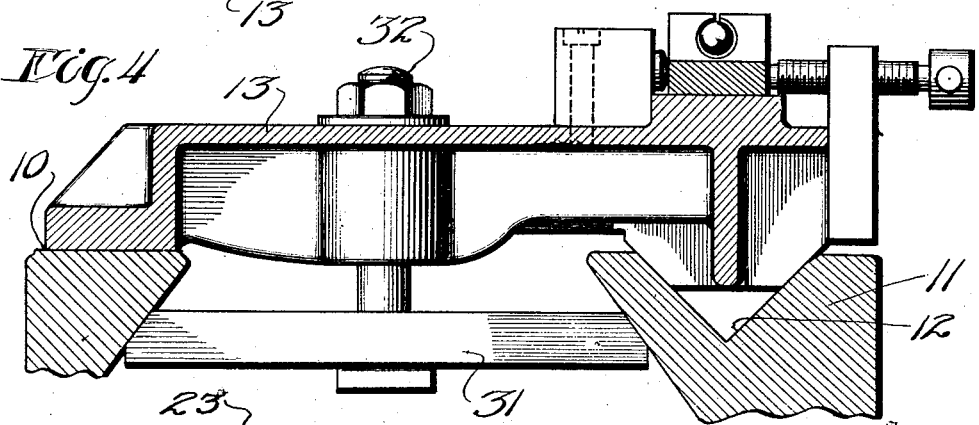
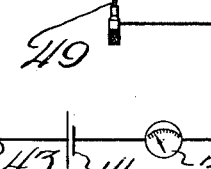

Patented Apr. 7, 1931

1,799,739

UNITED STATES PATENT OFFICE

JOHN B. ELFRING AND CARL G. SCHIELE, OF CINCINNATI, OHIO, ASSIGNORS TO CINCINNATI GRINDERS INCORPORATED, OF CINCINNATI, OHIO, A CORPORATION OF OHIO

PRECISION MEASURING DEVICE

Application filed November 13, 1926. Serial No. 148,310.

This invention relates to improvements in precision measuring devices and has particular reference to an improved mechanism for use in determining the accuracy of parts of machine tools.

The principal object of the present invention is the provision of a novel mechanism for accurately determining the correctness of the guide ways on the bed of a milling machine, grinding machine or like machine tool.

A further object of the present invention is the provision of a device which may be readily applied to a machine tool bed or like structure either during the process of manufacture thereof or at any subsequent period and which will make possible the measurement of deviation of any of the bed by relatively unskilled workmen.

Other objects and advantages of the present invention should be readily apparent from a consideration of the following specification taken in connection with the accompanying drawings illustrative of the principles described herein, and it will be understood that we may make any modifications in the specific structural details hereinafter disclosed within the scope of the appended claims, without departing from or exceeding the spirit of the invention.

Figure 1 is a fragmentary plan view of a machine tool bed having the present invention applied thereto.

Figure 2 is a sectional view illustrating the attachment of one of the test members taken as on the line 2—2 of Figure 1.

Figure 3 is an enlarged plan view of one of the fixtures.

Figure 4 is a vertical section on the line 4—4 of Figure 3.

Figure 5 is a bottom view of the test slide bearing the measuring and indicating mechanisms.

Figure 6 is a section view on the line 6—6 of Figure 5, and,

Figure 7 is a diagrammatic view of the electrical circuit.

In the drawings the numeral 10 designates the flat way of a machine tool bed having the portion 11 formed with the V way 12 in accordance with usual practise. It will be understood that it is customary in forming beds for grinding machine table slides or the like, to make use of a structure in which the alignment, position, etc., is primarily determined as by a V way or guide 12, while in view of the difficulties in accurately constructing a pair of barrel guide V's and maintaining the same in this relationship, the second weight supporting way for sliding movement of the parts is formed as a flat surface 10 and this structure is therefore illustrated in the present drawings, although it will be understood that the principles hereinafter described may be utilized with equal satisfaction with any form of guide ways for a sliding member.

The essential point to be determined is as to whether the V way 12 is absolutely straight or whether due to warping or deformation of the base casting or inaccuracy in machining, there is any irregularity in the groove, tending to produce a corresponding irregularity in the work whose shape is determined by movement of the table or the like along the groove. To determine such inaccuracies, we preferably make use of a structure such as shown in Figure 1, comprising a pair of bracket members 13 and 14 and an intermediate measuring slide 25. The bracket 14 has a flat surface as at 15 adapted to rest on the way 10 and a truncated V 16 to feed into the V way 12. A clamp plate 17 engaged beneath the overhang of the ways, together with a clamp bolt 18 serve to securely lock bracket 14 in the position determined by the interengagement of V 16 and way 12. This bracket is provided with the guide way 19 and head 20 of adjusting screw 21, whose position may be varied by rotation of knurled nut 22. Head 20 has secured thereto one end of the gauging wire 23, whose opposite end is provided with a ball 24.

This ball 24 is adapted to be received in socket 26 of the pivoted arm 27, which swings about stud 28 on bracket 13. The arm is urged in one direction as by the spring pressed plunger 29 and is adjustably shifted in the opposite direction against the pressure of the plunger by screw 30. In this manner it is possible to get a very accurate setting of the righthand end of the gauging wire as viewed in Fig. 1, so that it may correspond exactly in position with reference to the V way with the position occupied by the lefthand end which is rigidly determined on account of the fit of screw head 20 within the guide way 19.

Bracket 13 like bracket 14 is locked in position as by the use of clamp plate 31 and bolt 32. When it is desired to perform a measurement by the use of this apparatus the two brackets are securely clamped at the extreme ends of the table and nut 22 adjusted to produce a proper stretching tension on wire 23 and to be sure that there is neither appreciable play of the two nor any bends, kinks or the like therein.

The final adjustment of the shiftable end of the wire through swinging of arm 27 is then performed under the guidance of the measuring device, so that the measurement adjacent slides 13 and 14 as to position of the ends of wire will exactly coincide. This measuring device comprises a slide 25 having a truncated V portion 33 fitting into the V way and a flat portion 34 slidable on the way 10. Mounted on the slide is a galvanometer 35 having the terminals 36 and 37, from which extend lead wires 38 and 39. Lead wire 39 is coupled through contact strap 40 with one terminal of the dry cell 41 secured in bracket 42 on the underside of slide 25. The other pole of the battery is grounded as through the locking screw 43 to the bed of the bracket and thence to the bed of the machine itself. The terminal 38 is coupled with the insulated support 44 for the micrometer barrel 45, which bears the adjusting head 48 and spindle 49, which thus forms a part of the electrical circuit as is diagrammatically indicated in Figure 7.

In operation the slide 25 is moved first to the left in contact with bracket 14 and the micrometer brought up until the spindle just touches wire 23 and the reading taken in lieu thereof on the micrometer. It is possible that a skilled operator may accurately determine the contact between the wire and spindle and thus render it unnecessary to employ supplemental indicating means. To enable the device to be more readily operated, however, use has been made of the galvanometer or similar indicating device which will register as soon as sufficient contact has been made between the micrometer spindle and the wire to complete the electrical circuit and quite possibly before the contact could be physically or visually recognized. This adjustment having been determined, slide 25 is then moved to the right hand side as viewed in Figure 1, and the position of wire 23 adjusted by back and forth movement of screw 30, until an identical reading is secured at that end. The wire then being under tension will form a straight line longitudinally of the bed of the machine and presumably parallel with the V way 12 to be measured. The slide 25 is then moved back and forth along the ways of the bed as desired and reading taken either as to whether or not the parts remain in contact at all points completing the electrical circuit or individual readings taken at a plurality of predetermined points or at a multiplicity of points. These readings will establish the fact as to whether or not the V way forming the guiding basis for slide 25 is absolutely true to a fractional part of a thousandth of an inch, or whether there are longitudinal windings, irregularities or the like, which must be corrected.

The bed having been measured, it is merely necessary to release the bolts 18 and 32 to remove the entire measuring structure from the machine.

We claim:—

1. In a measuring device for accurately measuring the wind in the ways of a machine tool bed the combination with a support member carried by the ways at each end thereof, and a taut wire conductor extending between the supporting members parallel with the theoretical line of the way, of a slide conforming substantially to the said ways and supported thereby for sliding movement therealong, a post extending from the slide, mechanically adjustable measuring means carried by the post in line with the conductor wire, a source of electrical energy supported by the slide, an electrical current flow meter supported by the slide, conductors connecting the source of electric supply, the taut wire and the electrical flow indicating meter in series with one another and with the post, and means for adjusting the mechanical measuring means carried by the post whereby same will engage the taut wire to complete an electrical circuit causing a flow of the electric energy and a reading thereof on the electrical flow meter.

2. In a device for accurately measuring the wind in the ways of a machine tool bed the combination of a taut conductor wire extending parallel with the theoretical line of the way to be measured, a slide conforming substantially to the contour of the way supported thereby and movable therealong, an electrical source of energy carried by the slide and grounded through the bed to be measured and electrically connected with the taut conductor wire, an adjustable contact carried by the slide for engagement with the taut conductor wire, means electrically connecting the adjustable contact with the other side of the electrical source of energy, and means associated with the adjustable contact for measuring the amount of adjustment thereof prior to the engagement with the said taut conductor wire.

3. In a device for accurately measuring the wind in the ways of a machine tool bed the combination of a taut conductor wire extending parallel with the theoretical line of the way to be measured, a slide conforming substantially to the contour of the way supported thereby and movable therealong, an electrical source of energy carried by the slide and grounded through the bed to be measured and electrically connected with the taut conductor wire, an adjustable contact carried by the slide for engagement with the taut conductor wire, means electrically connecting the adjustable contact with the other side of the electrical source of energy, means associated with the adjustable contact for measuring the amount of adjustment thereof prior to the engagement with the said taut conductor wire, and means in series with the electric source of energy and adjustable contact for indicating the flow of current upon engagement of the contact with the taut conductor wire.

4. A measuring device for use in accurately determining the wind in the ways of a machine tool bed comprising a slide substantially conforming to the contour of said ways and supported thereby for sliding movement therealong, a taut conductor extending parallel with the theoretical line of the way and lying in a plane above the plane of movement of the slide, an adjustable contact carried by the slide for engagement with the taut conductor wire and movable with the slide in a plane adjacent the wire determined by the ways, an electrical circuit including a source of electrical energy carried by the slide having one side thereof grounded through the slide, machine tool bed and taut wire, the electrical circuit extending from the other side of the source of electrical energy through the adjustable contact, and means for adjusting the contact to engage the taut conductor wire for completing the electrical circuit and for determining the amount of adjustment given to the contact.

5. A measuring device for use in accurately determining the wind in the ways of a machine tool bed comprising a slide substantially conforming to the contour of said ways and supported thereby for sliding movement therealong, a taut conductor extending parallel with the theoretical line of the way and lying in a plane above the plane of movement of the slide, an adjustable contact carried by the slide for engagement with the taut conductor wire and movable with the slide in a plane adjacent the wire determined by the ways, an electrical circuit including a source of electrical energy carried by the slide having one side thereof grounded through the slide, machine tool bed and taut wire, the electrical circuit extending from the other side of the source of electrical energy through the adjustable contact, means for adjusting the contact to engage the taut conductor wire for completing the electrical circuit and for determining the amount of adjustment given to the contact, and means in series with the electrical circuit for indicating the flow of current therethrough.

In testimony whereof we affix our signatures.

JOHN B. ELFRING.
CARL G. SCHIELE.